April 7, 1931.  T. SATOW  1,799,256
APPARATUS FOR TREATING SOY BEANS
Filed Jan. 23, 1926
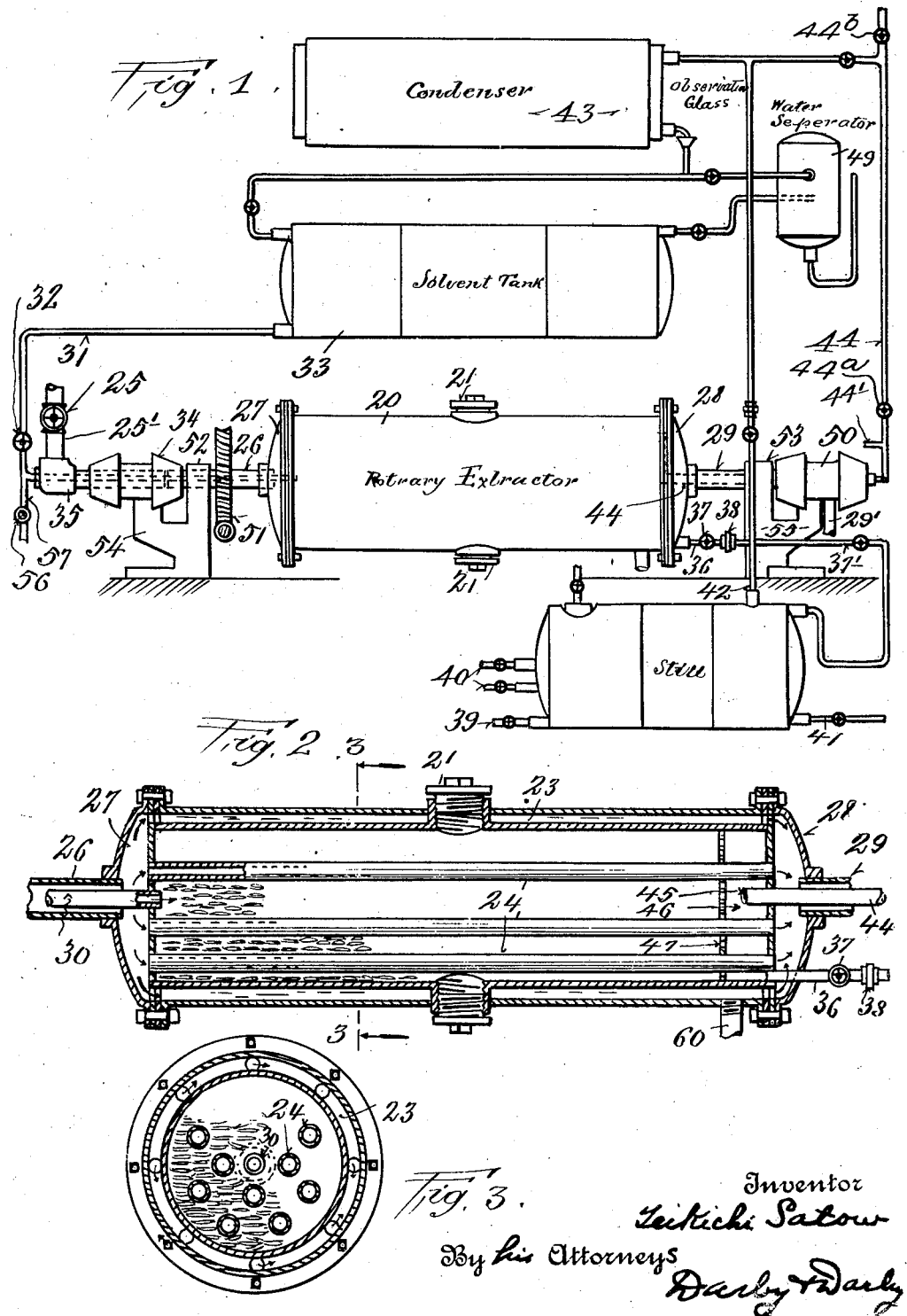

Patented Apr. 7, 1931

1,799,256

UNITED STATES PATENT OFFICE

TEIKICHI SATOW, OF TOKYO, JAPAN

APPARATUS FOR TREATING SOY BEANS

Application filed January 23, 1926. Serial No. 83,199.

This invention relates to an apparatus for treating soy-beans for the purpose of removing the oily content and other volatile matter therefrom and to prepare said beans for food or other purposes without denaturalizing or decomposing the proteid content of the beans. A further object includes the provision of means for controlling the solvent which is used to extract the oil from the bean. I also provide means for controlling the temperature necessary to remove the last trace of volatile matter and to so act on the beans as to render said beans palatable when used as a food product. I further provide means for effectively removing excess of moisture in connection with the regulation of the treating temperature, so as to obviate the danger of hydrolyzing the proteids or of decreasing the yield or the quality thereof.

Another object of my invention includes the provision of apparatus whereby the oil and other volatile content from proteid containing compositions can be extracted without injuriously acting upon the proteids so as to destroy its value as a food or for manufacturing purposes. I also provide means for controlling the solvent which is used to remove the oil from the material undergoing treatment.

Other objects will appear hereinafter, and I attain these objects by the construction illustrated in the accompanying drawings, in which Fig. 1 is a view in elevation of an apparatus which embodies the principles of my invention.

Fig. 2 is a sectional view of the rotary extractor or treating drum which forms a part of my treating apparatus, and Fig. 3 is a section taken on the line 3—3 of Fig. 2.

Like numerals refer to similar parts throughout the several views.

The value of the soy-bean as a source of food rich in proteids is well recognized. Of late the use of its oil for numerous industrial purposes, and the value of the by-product has been given much study. Up to the time of my studies, from which sprang the present invention, in the usual process of extracting oil from the soy-bean, the denaturalization or decomposition of the proteid was given no consideration as the by-product or the solid bean content which remained after the removal of the oil was used only as a fertilizer or as cattle food. In the present case, however, it is a matter of great importance that the proteids should be obtained in their pure state and free from denaturalization or decomposition, and thereby produce a maximum of high quality suitable as a source of food for human consumption, or available in the technical arts and for the manufacture of various articles. To this end, I have invented and devised an apparatus whereby the soy-bean is successfully treated on a commercial scale for the production, chiefly, of its solid content in the most desirable form and wherein the oil becomes in fact a by-product. In perfecting my apparatus I have borne in mind two chief factors which, during the process of removing the oil are likely to cause denaturalization of the proteids or to act injuriously on the solid bean content. These factors are excess of moisture in the bean and high treating temperature. Although a high temperature accelerates the rate of oil diffusion in the solvent employed for the removal of the oil, it is also a chief cause of hydrolyzing the proteids and also produces an inferior quality in decreased quantity. Where benzine is the oil solvent employed to remove the oil from the bean, the temperature should not exceed 45° C. and the moisture content of the material should be below 13% of the weight of the material. I accordingly provide means for removing excess of moisture from the mass of beans to be treated and for regulating the temperature of the mass treated. These conditions can be controlled in various ways. In the accompanying drawing, I have shown a rotary extractor of any suitable size and preferably in the form of a drum 20 having man-holes 21 for charging the extractor drum with the soy-beans, which are preferably, although not necessarily, flattened or partially broken so as to facilitate the extraction of the oil. The drum is provided with a steam jacket 23 and steam pipes or tubes 24 for distributing the heating medium through the drum and its contents. Steam is admitted from any suitable source by means of a valve 25 and supply pipe 25' into pipe 26 and thence to the drumhead 27. A steam collector head 28 on the end of the drum opposite head 27 directs steam from the jacket and tubes to the outlet pipe 29 to a discharge pipe 29' in the stuffing box 50. The drum is rotated by any suitable means, as a drive gear 51 or the like, and the steam pipes 26 and 29 serve also as journals which are supported in bearings 52 and 53 of the foundation supports 54 and 55.

The selected oil solvent, such as benzine, carbon tetrachloride and the like, is admitted directly on to the bean mass in the drum by any suitable means, as a pipe 30 and feed pipe 31, having a valve 32 for regulating the flow from the supply solvent tank 33. Both the stationary steam supplying pipes 25', and the stationary solvent supplying pipe 31 are rotatively connected to the respective rotary steam pipe 26 and the cooperating rotary solvent supplying pipe 30 in any desired manner, as through a stuffing box 34 and steam joint 35. The solvent and oil are withdrawn from the drum by suitable means, as a pipe 36, having a valve 37 and connected by coupling 38 to a collector pipe 37' which leads the solvent and oil into the still for separating the solvent from the oil by the usual distillation method. This still may be supplied with steam by steam pipes 39 and 40, and the oil may be recovered at 41. The solvent vapor is conveyed by pipe 42 to condenser 43, in the manner well known to the art, and it will therefore not be necessary to explain the operation of the still and the condenser.

To remove the last trace of the solvent, or other volatile matter and vapor, I provide in extractor 20 a vapor discharge pipe 44, which opens at 45 into the solvent vapor chamber 46 of the drum 20 and at the opposite end to the open air or to the condenser. This chamber may be formed in the end of the drum by a screened partition 47 suitable for keeping the solid bean product from entering the mouth 45 of the vapor discharge pipe 44. This pipe continues through the stuffing box 50 up to the condenser 43. From the condenser the solvent is passed to the storage solvent tank 33 either directly, as shown, or through the water separator 49 for purifying the solvent. The vaporizing of the last traces of solvent in the extractor 20 is aided by hot dry air being admitted thereto through pipe 30 from a suitable source which is controlled by a valve 56 in the supply pipe 57. It is of course understood that the solvent supplying pipe 31 is closed by valve 32 when hot air is passed into the extractor for drying the beans or for completely removing the solvent and for finally semi-baking or roasting the solid bean product, either as the flattened or cracked bean, or as a meal or flour. Condensed water is removed from the steam jacket by a drain pipe 60, and the finished and roasted bean product is removed through one of the man-holes 21, of which one or more are opened.

From the description thus far given, the operation of my treating apparatus will be readily understood. The extractor, which in this instance is a drum, is charged with soybeans through a man-hole 21. The beans may be hulled or not as may be desired. The hulled bean is for some purposes preferred. In any case, I prefer to flatten the bean or it may even be cracked or coarsely broken. If the moisture content is too high, or above 12.5% or 13%, I rotate the drum, suitably warmed by the steam system above set forth and pass dry hot air through the rotating mass and out through pipe 44 until the desired conditions are obtained. During this step of the operation valve 44b is of course open. The hot air valve 56 and valve 44b are then closed and the solvent valve 32 opened to admit the selected oil solvent into the extractor. Usually, and for the best results, I half fill the extractor and cover the beans with the solvent. Steam in the steam jacket is regulated to maintain the proper temperature to about 40° C. to 45° C. while the extractor is rotated until the oil has been thoroughly diffused in the solvent. The drum is then stopped and coupling 38 adjusted to drain off the diffused oil and solvent by opening valve 37. It may be necessary to repeat the solvent treatment step to fully remove the oil. Thereafter I admit hot, dry air through pipe 30 and valve 56, as stated above. The last traces of solvent are thus removed and the temperature is raised to 115° C. to 120° C. for a suitable time to semi-roast or semi-bake the solid bean product in the drum. Under ordinary conditions, this requires about 20 minutes. After the solid product has been properly baked, it is discharged from the extractor through one or more of the manholes. For this purpose, the drum may be rotated. It is understood that this apparatus is suited and designed to completely treat the bean so as to produce a roasted or partially roasted, deoiled bean product, either coarsely broken or as meal, which results when the drum is rotated at a comparatively high rate during the steps of drying and roasting. The apparatus is, moreover, capable of carrying out the steps of deoiling and of removing the solvent and volatile matter separately from the final baking or roasting step. Compressed air may be used to clean screen 47 which air is admitted to chamber 46 by adjustable means, as through pipe 44' connected to a suitable compressor (not shown). Obviously valve 44a in pipe 44 is closed before compressed air is admitted.

Having now described my invention, what

I claim as new and useful, of my own invention, and desire to secure by Letters Patent is:

1. In an oil extraction and heat treating apparatus, the combination of a rotating drum having steam heads, heat distributing means connecting said steam heads and extending through said drum for maintaining a uniform temperature throughout, hollow journals for said drum, bearings on which the drum is caused to rotate, means on one of said journals to rotate said drum, said journals serving as steam conduits respectively for admitting to and carrying off steam from the drum, a solvent supplying pipe extending through one of said journals into the interior of the drum for supplying a solvent, a pipe extending out of the extractor and through the other of said hollow journals for removing volatile matter, and means for removing the solvent and diffused oil from the interior of the drum.

2. An apparatus for removing the oil from soy-beans and for semi-baking the solid bean content, which comprises a treating drum having a treating chamber in which the beans are subjected to an oil extraction step, a steam head at each end, heat distributing pipes connecting said heads and extending through said chamber, a pipe for supplying the solvent into said treating chamber, and means for converting said solvent supplying pipe into a hot air supplying pipe whereby hot air is supplied in the chamber to drive off the solvent and to semi-bake the soy-beans.

3. In an apparatus for removing oil from soy-beans and semi-baking said beans, a rotatively mounted drum, hollow journals on which said drum is mounted to rotate, a coupling on each of said journals united with a stationary pipe, an inner pipe extending through each of said hollow journals and into the drum, one for admitting solvent into the drum and the other for removing said solvent vapor, and a valve for each of said pipes.

In testimony whereof I have hereunto set my hand on this 7th day of January, A. D. 1926.

TEIKICHI SATOW.